(12) United States Patent
Tao et al.

(10) Patent No.: US 12,136,698 B2
(45) Date of Patent: Nov. 5, 2024

(54) NON-AQUEOUS ELECTROLYTE SECONDARY BATTERY AND METHOD FOR MANUFACTURING SAME

(71) Applicant: SANYO Electric Co., Ltd., Daito (JP)

(72) Inventors: Yohei Tao, Hyogo (JP); Ken Kaneko, Hyogo (JP); Keisuke Minami, Hyogo (JP); Toyoki Fujihara, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 676 days.

(21) Appl. No.: 17/417,495

(22) PCT Filed: Dec. 19, 2019

(86) PCT No.: PCT/JP2019/049866
§ 371 (c)(1),
(2) Date: Jun. 23, 2021

(87) PCT Pub. No.: WO2020/137816
PCT Pub. Date: Jul. 2, 2020

(65) Prior Publication Data
US 2022/0115698 A1    Apr. 14, 2022

(30) Foreign Application Priority Data
Dec. 28, 2018 (JP) .................. 2018-246589

(51) Int. Cl.
*H01M 10/0567* (2010.01)
*H01M 4/02* (2006.01)
(Continued)

(52) U.S. Cl.
CPC ....... *H01M 10/0567* (2013.01); *H01M 4/505* (2013.01); *H01M 4/525* (2013.01);
(Continued)

(58) Field of Classification Search
CPC . H01M 10/0566–0567; H01M 10/052; H01M 10/0525; H01M 10/0568;
(Continued)

(56) References Cited

U.S. PATENT DOCUMENTS

2009/0246628 A1* 10/2009 Adachi ............... H01M 4/13
429/209
2012/0308881 A1* 12/2012 Tokuda ............ H01M 10/0567
429/199
(Continued)

FOREIGN PATENT DOCUMENTS

CN    104167564 A    11/2014
CN    106299457 A    1/2017
(Continued)

OTHER PUBLICATIONS

Office Action dated Mar. 1, 2022, issued in counterpart IN Application No. 202147027929, with English Translation. (5 pages).
(Continued)

*Primary Examiner* — Mayla Gonzalez Ramos
*Assistant Examiner* — Bethany C Garcia
(74) *Attorney, Agent, or Firm* — WHDA, LLP (57) ABSTRACT

A non-aqueous electrolyte secondary battery including a positive electrode core; a positive electrode plate having a positive electrode active material layer formed on the positive electrode core; a negative electrode plate; a flat wound electrode assembly in which the positive electrode plate and the negative electrode plate are wound with a separator therebetween; and a non-aqueous electrolyte, wherein the positive electrode active material is a manganese-containing lithium transition metal composite oxide, the BET specific surface area of the positive electrode active material is 2.0-3.0 $m^2/g$, the total surface area of the positive electrode active material contained in the positive electrode active (Continued)

material layer is 70-90 m², and the value of A/B is 0.03-0.09 (μmol/m²), where A (μmol) is the total amount of $FSO_3$ contained in the non-aqueous electrolyte, and B (m²) is the total area of the positive electrode active material contained in the positive electrode active material layer.

6 Claims, 2 Drawing Sheets

(51) Int. Cl.
    *H01M 4/505* (2010.01)
    *H01M 4/525* (2010.01)
    *H01M 10/0525* (2010.01)
    *H01M 10/0587* (2010.01)
    *H01M 50/409* (2021.01)
    *H01M 50/489* (2021.01)

(52) U.S. Cl.
    CPC ... *H01M 10/0525* (2013.01); *H01M 10/0587* (2013.01); *H01M 50/409* (2021.01); *H01M 50/489* (2021.01); *H01M 2004/021* (2013.01); *H01M 2004/028* (2013.01); *H01M 2300/0025* (2013.01)

(58) Field of Classification Search
    CPC ......... H01M 10/0587; H01M 10/0431; H01M 4/505; H01M 4/525; H01M 4/485; H01M 2300/0025; H01M 2004/021; H01M 2004/028; H01M 50/489; H01M 50/409; H01M 10/446; H01M 4/587; H01M 4/5825; H01M 4/366; H01M 4/02; Y02P 70/50; Y02T 10/70; Y02E 60/10
See application file for complete search history.

(56) References Cited

U.S. PATENT DOCUMENTS

| | | | |
|---|---|---|---|
| 2014/0038062 A1 | 2/2014 | Kawakami et al. | |
| 2014/0186722 A1 | 7/2014 | Lim et al. | |
| 2015/0188196 A1 | 7/2015 | Minami et al. | |
| 2015/0357678 A1* | 12/2015 | Tsubouchi | H01M 4/485 429/200 |
| 2016/0226106 A1* | 8/2016 | Minami | H01M 10/0587 |
| 2016/0380303 A1 | 12/2016 | Minami et al. | |
| 2019/0013543 A1 | 1/2019 | Tao et al. | |

FOREIGN PATENT DOCUMENTS

| | | |
|---|---|---|
| JP | 2012-230897 A | 11/2012 |
| JP | 2013-131392 A | 7/2013 |
| JP | 2014-127313 A | 7/2014 |
| JP | 2015-125833 A | 7/2015 |
| JP | 2015-125857 A | 7/2015 |
| JP | 2015-125858 A | 7/2015 |
| JP | 2015-230789 A | 12/2015 |
| JP | 2016-91724 A | 5/2016 |
| JP | 2016-164879 A | 9/2016 |
| JP | 5984014 B2 | 9/2016 |
| JP | 2019-16483 A | 1/2019 |

OTHER PUBLICATIONS

International Search Report dated Mar. 3, 2020, issued in counterpart International Application No. PCT/JP2019/049866 (3 pages).
English Translation of Chinese Search Report dated Dec. 19, 2023, issued in counterpart CN Patent Application No. 201980083768.0. (4 pages).

* cited by examiner

NON-AQUEOUS ELECTROLYTE SECONDARY BATTERY AND METHOD FOR MANUFACTURING SAME

TECHNICAL FIELD

The present invention relates to a non-aqueous electrolyte secondary battery and a method for producing the same.

BACKGROUND ART

Non-aqueous electrolyte secondary batteries are used for the drive power source for driving hybrid electric vehicles (PHEV, HEV) and electric vehicles (EV). Non-aqueous electrolyte secondary batteries used for such a drive power source are more required for improvement in performance and reliability.

Non-aqueous electrolyte secondary batteries used for the drive power source are also used in low-temperature environments. Therefore, the non-aqueous electrolyte secondary batteries used for the drive power source are required to have excellent battery characteristics even in low-temperature environments. In addition, the non-aqueous electrolyte secondary batteries used for the drive power source may be stored at high temperatures, and therefore are required to have no deterioration of battery characteristics when stored at high temperatures.

For example, Patent Literature 1 below has proposed non-aqueous organic solvents including propylene carbonate and non-aqueous electrolytes including lithium bisfluorosulfonylimide for improving the low temperature output characteristics.

CITATION LIST

Patent Literature

PATENT LITERATURE 1: Japanese Unexamined Patent Application Publication No. 2016-164879

SUMMARY

One of the objectives of the present invention is to provide a non-aqueous electrolyte secondary battery that is excellent in low temperature output characteristics and high temperature storage characteristics.

The non-aqueous electrolyte secondary battery of one embodiment of the present invention comprises:

a positive electrode plate having a positive electrode core body and a positive electrode active material layer formed on the positive electrode core body, the positive electrode active material layer including a positive electrode active material;

a negative electrode plate;

a flat wound electrode assembly obtained by winding the positive electrode plate and the negative electrode plate with a separator therebetween; and a non-aqueous electrolyte, wherein the positive electrode active material is a lithium transition metal composite oxide including manganese, the specific surface area of the positive electrode active material is 2.0 to 3.0 m$^2$/g, the total surface area of the positive electrode active material included in the positive electrode active material layer is 70 to 80 m$^2$, and when the total amount of FSO$_3$ included in the non-aqueous electrolyte is denoted by A (μmol) and the total area of the positive electrode active material included in the positive electrode active material layer is denoted by B (m$^2$), the value of A/B is 0.03 to 0.09 (μmol/m$^2$).

According to the above configuration, the BET specific surface area of the positive electrode active material is increased, thereby increasing the reaction area during charge and discharge, particularly reducing the charge transfer resistance during low temperature discharge. In addition, the inclusion of a specific amount of FSO$_3$ in the non-aqueous electrolyte causes FSO$_3$ to be coordinated in a preferable condition on the surface of the positive electrode active material, allowing more effective suppression of the side reaction between the positive electrode active material and the non-aqueous electrolyte during high temperature storage. Therefore, this can not only effectively suppress the elution of manganese included in the positive electrode active material but also effectively suppress the formation of high resistance deposits on the surface of the positive electrode active material. Therefore, obtained is the non-aqueous electrolyte secondary battery that is excellent in low temperature output characteristics and high temperature storage characteristics.

FSO$_3$ included in the non-aqueous electrolyte may exist as a fluorosulfuric acid salt such as lithium fluorosulfonate. FSO$_3$ included in the non-aqueous electrolyte solution may also exist as fluorosulfuric acid anion.

The value of A/B is preferably between 0.05 and 0.07 (μmol/m$^2$). This provides the non-aqueous electrolyte secondary battery that is superior in low temperature output characteristics and high temperature storage characteristics.

The amount of manganese included in the lithium transition metal composite oxide is preferably 10 to 40 mol % with respect to the total amount of the transition metal included in the lithium transition metal composite oxide.

The lithium transition metal composite oxide preferably includes nickel and cobalt.

Preferably, an exposed portion of the wound positive electrode core body is provided at one end of the flat wound electrode assembly, and an exposed portion of the wound negative electrode core body is provided at the other end of the flat wound electrode assembly. This provides the non-aqueous electrolyte secondary battery that is superior in low temperature output characteristics.

Preferably, a separator having a polyolefin layer is placed between the positive electrode plate and the negative electrode plate, the surface of the negative electrode active material layer is in direct contact with the polyolefin layer, and the separator has a thickness of 14 to 23 μm. This provides a non-aqueous electrolyte secondary battery that is superior in initial low temperature output characteristics.

The method for producing the non-aqueous electrolyte secondary battery of one embodiment of the present invention is a method for producing a non-aqueous electrolyte secondary battery, comprising:

a positive electrode plate having a positive electrode core body and a positive electrode active material layer formed on the positive electrode core body, the positive electrode active material layer including a positive electrode active material;

a negative electrode plate;

a flat wound electrode assembly obtained by winding the positive electrode plate and the negative electrode plate with a separator therebetween;

a non-aqueous electrolyte; and a battery case accommodating the wound electrode assembly and the non-aqueous electrolyte, the method having:

a step of producing the electrode assembly including the positive electrode plate wherein the positive electrode active material is a lithium transition metal composite oxide including manganese, the BET specific surface area of the positive electrode active material is 2.0 to 3.0 m$^2$/g, and the total surface area of the positive electrode active material included in the positive electrode active material layer is 70 to 80 m$^2$, and a step of placing the electrode assembly and the non-aqueous electrolyte including FSO$_3$ in the battery case, wherein, when the total amount of FSO$_3$ included in the non-aqueous electrolyte is denoted by A (μmol) and the total area of the positive electrode active material included in the positive electrode active material layer is denoted by B (m$^2$), the value of A/B is 0.03 to 0.09 (μmol/m$^2$).

Advantageous Effects of Invention

The present invention provides a non-aqueous electrolyte secondary battery that is excellent in low temperature output characteristics and high temperature storage characteristics.

DESCRIPTION OF EMBODIMENTS

Hereinafter, the embodiment of the present invention will be described in detail. However, the embodiment shown below is an example of the present invention, and the present invention is not limited to this embodiment.

Figure 1:
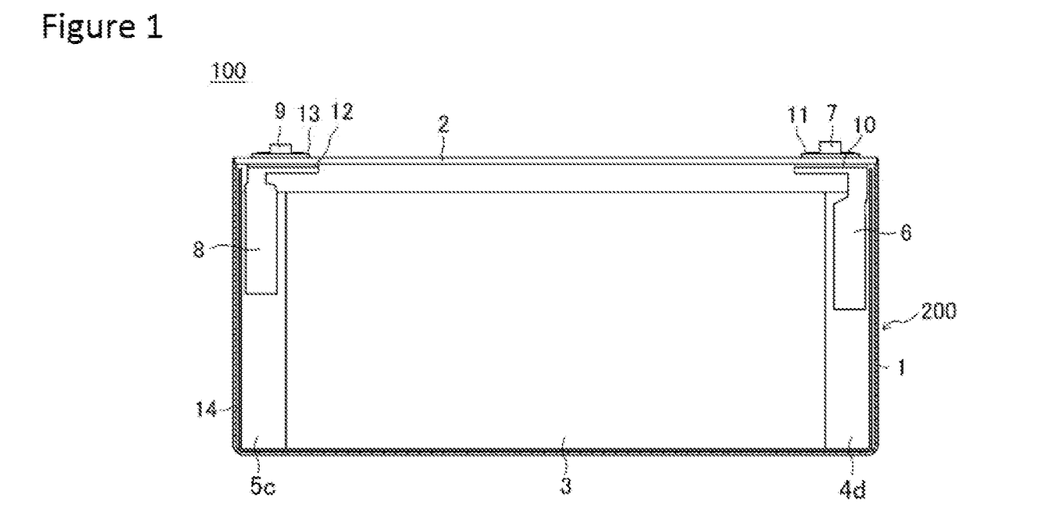
FIG. 1 is a schematic front view showing the inside of the battery, without the front portion of the battery case and the front portion of the insulating sheet of the non-aqueous electrolyte battery according to the embodiment.
Figure 2:
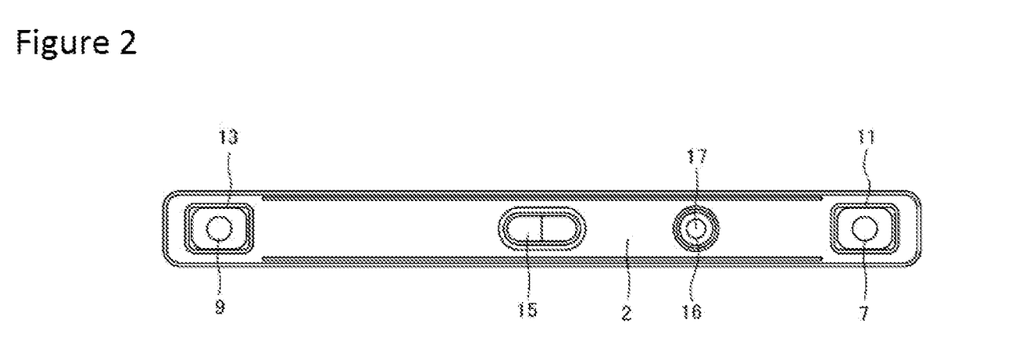
FIG. 2 is a top view of the non-aqueous electrolyte battery according to the embodiment.

FIG. 1 and FIG. 2 are used to describe the configuration of rectangular non-aqueous electrolyte secondary battery 100 according to the embodiment. As shown in FIG. 1 and FIG. 2, the rectangular non-aqueous electrolyte secondary battery 100 according to the embodiment has a rectangular bottom-shaped cylindrical exterior assembly 1 with an opening and a sealing plate 2 sealing the opening of the exterior assembly 1. A battery case 200 is composed of the exterior assembly 1 and the sealing plate 2. The exterior assembly 1 accommodates a non-aqueous electrolyte and the flat wound electrode assembly 3 in which a band-shaped positive electrode plate 4 and a band-shaped negative electrode plate 5 are wound with a separator (not shown) therebetween. The wound electrode assembly 3 has an exposed portion of the wound positive electrode core body 4d at one end, and has an exposed portion of the wound negative electrode core body 5c at the other end.

The positive electrode current collector 6 is connected to the exposed portion of the positive electrode core body 4d, and the positive electrode current collector 6 and a positive electrode terminal 7 are connected electrically. An inner insulating member 10 is placed between the positive electrode current collector 6 and the sealing plate 2, and the outer insulating member 11 is placed between the positive electrode terminal 7 and the sealing plate 2.

The negative electrode current collector 8 is connected to the exposed portion of the negative electrode core body 5c, and the negative electrode current collector 8 and the negative electrode terminal 9 are connected electrically. An inner insulating member 12 is placed between the negative electrode current collector 8 and the sealing plate 2, and an outer insulating member 13 is placed between the negative electrode terminal 9 and the sealing plate 2.

A resin insulating sheet 14 is placed between a wound electrode assembly 3 and the exterior assembly 1. In the sealing plate 2, provided is a gas exhaust valve 15 that breaks when the pressure in the battery case 200 is the specified value or more to exhaust gas in the battery case 200 to outside of the battery case 200. In addition, a non-aqueous electrolyte injection hole 16 is formed in the sealing plate 2. This non-aqueous electrolyte injection hole 16 is sealed by a sealing member 17 after a non-aqueous electrolyte is injected into the battery case 200.

Hereinafter, a method for producing a non-aqueous electrolyte secondary battery 100 will be described.

[Production of Positive Electrode Plate]

The lithium transition metal composite oxide represented by LiNi$_{0.35}$Co$_{0.35}$Mn$_{0.30}$O$_2$ as a positive electrode active material, carbon powder as a conductive agent, and polyvinylidene fluoride (PVdF) as a binding agent are mixed with N-methyl-2-pyrrolidone (NIP) as a dispersion medium to produce a positive electrode mixture slurry. Herein, the mass ratio of the positive electrode active material, conductive agent, and binding agent included in the positive electrode mixture slurry is 90.3:7.0:2.7.

The positive electrode mixture slurry produced in the above method is applied onto both sides of an aluminum foil having a thickness of 15 μm as a positive electrode core body by using a die-coater. Thereafter, the positive electrode mixture slurry is dried to remove NMP as a dispersion medium. A positive electrode active material layer is compressed by using a pair of compression rollers. Then, this is cut to a predetermined size to form the exposed portion of the positive electrode core body in which no positive electrode active material layer is formed on both sides along the longitudinal direction of one end in the width direction of the positive electrode plate, and thus the positive electrode plate is provided.

Figures 3A, 3B:
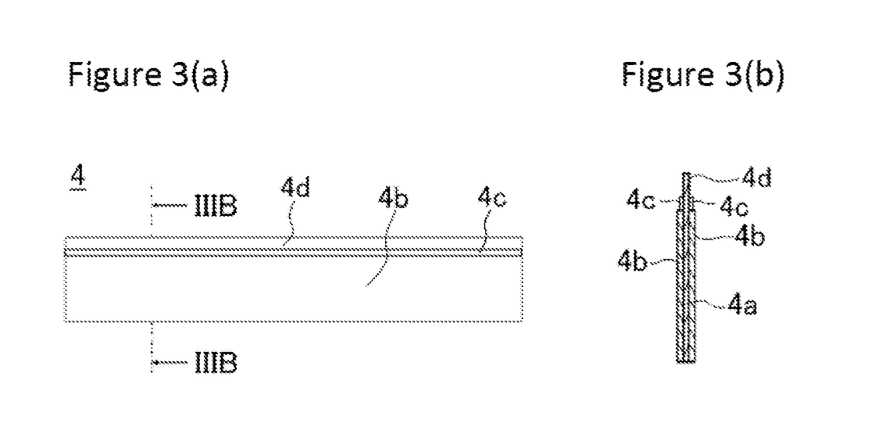
FIG. 3(a) is a plan view of the positive electrode plate according to the embodiment.
FIG. 3(b) is a sectional view along the IIIB-IIIB line in (a).

As shown in FIGS. 3(a) and (b), a positive electrode active material layer 4b including the positive electrode active material is formed on both sides of a positive electrode core body 4a. At one end in the width direction of the positive electrode plate 4, provided is an exposed portion of a positive electrode core body 4d in which no positive electrode active material layer 4b is formed on both sides of the positive electrode core body 4a. As shown in FIGS. 3(a) and (b), a positive electrode protective layer 4c can be provided in the vicinity of the end in the width direction of the positive electrode active material layer 4b in the positive electrode core body 4a. The positive electrode protective layer 4c preferably includes ceramic particles and a binder.

[Production of Negative Electrode Plate]

Graphite powder as a negative electrode active material, carboxymethylcellulose (CMC) as a thickening material, and styrene-butadiene rubber (SBR) as a binding agent are dispersed in water at a mass ratio of 99.2:0.6:0.2 to produce a negative electrode mixture slurry.

The negative electrode mixture slurry produced in the above method is applied onto both sides of a copper foil having a thickness of 8 μm as a negative electrode core body by using a die-coater. Then, the negative electrode mixture slurry is dried to remove water as a dispersion medium, and the negative electrode active material layer is compressed to a predetermined thickness by a roll press. Then, this is cut to a predetermined size to form the exposed portion of the negative electrode core body in which no negative electrode active material layer is formed on both sides along the longitudinal direction of one end in the width direction of the negative electrode plate, and thus the negative electrode plate is provided.

Figure 4A:
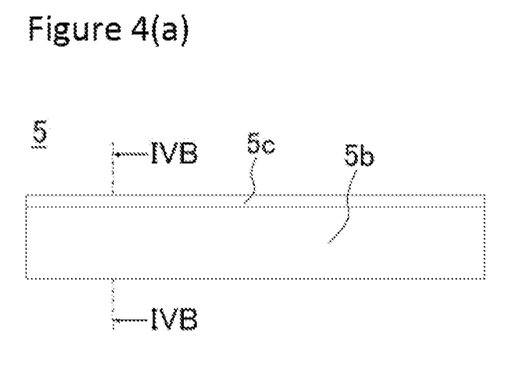
FIG. 4(a) is a plan view of the negative electrode plate according to the embodiment.
Figure 4B:
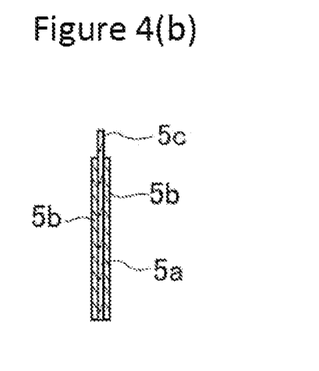
FIG. 4(b) is a sectional view along the IVB-IVB line in (a).

As shown in FIGS. 4(a) and (b), a negative electrode active material layer 5b including the negative electrode active material is formed on both sides of a negative electrode core body 5a. At one end in the width direction of the negative electrode plate 5, provided is an exposed portion of a negative electrode core body 5c in which no negative electrode active material layer 5b is formed on both sides of the negative electrode core body 5a.

[Production of Flat Wound Electrode Assembly]

The band-shaped positive electrode plate 4 and band-shaped negative electrode plate 5 produced in the above method are wound through a band-shaped separator with a three-layer of polypropylene/polyethylene/polypropylene and a thickness of 16 μm, and are subjected to press molding to a flat shape to produce a flat wound electrode assembly 3. Then, the exposed portion of the wound positive electrode core body 4d is formed at one end in the winding axis direction of the flat wound electrode assembly 3, and the exposed portion of the negative electrode core body 5c is formed at the other end.

[Adjustment of Non-Aqueous Electrolyte]

Ethylene carbonate (EC), ethyl methyl carbonate (EMC), dimethyl carbonate (DMC), and methylene propionate (MP) are mixed in a volume ratio (25° C., 1 atm) at 25:37:35:3 to produce a mixed solvent. Into this mixed solvent, $LiPF_6$ as a solute was added so as to be 1.15 mol/L, and lithium fluorosulfonate is further added to provide a non-aqueous electrolyte.

[Mounting Terminal and Current Collector to Sealing Plate]

The outer insulating member 11 is placed on the battery outer side of a positive electrode terminal mounting hole of the sealing plate 2. The inner insulating member 10 and the positive electrode current collector 6 are placed on the battery inner side of a positive electrode terminal mounting hole of the sealing plate 2. Thereafter, from the battery outer side, the positive electrode terminal 7 is inserted into the through hole of the outer insulating member 11, the positive electrode terminal mounting hole of the sealing plate 2, the through hole of the inner insulating member 10, and the through hole of the positive electrode current collector 6. The tip side of the positive electrode terminal 7 is crimped onto the positive electrode current collector 6. Thereafter, the crimped portion of the positive electrode terminal 7 and the positive electrode current collector 6 are welded and connected.

The outer insulating member 13 is placed on the battery outer side of a negative electrode terminal mounting hole of the sealing plate 2. The inner insulating member 12 and the negative electrode current collector 8 are placed on the battery inner side of a negative electrode terminal mounting hole of the sealing plate 2. Thereafter, from the battery outer side, the negative electrode terminal 9 is inserted into the through hole of the outer insulating member 13, the negative electrode terminal mounting hole of the sealing plate 2, the through hole of the inner insulating member 12, and the through hole of the negative electrode current collector 8. The tip side of the negative electrode terminal 9 is crimped onto the negative electrode current collector 8. Thereafter, the crimped portion of the negative electrode terminal 9 and the negative electrode current collector 8 are welded and connected.

[Connection between Current Collector and Wound Electrode Assembly]

The positive electrode current collector 6 is welded and connected to the exposed portion of the positive electrode core body 4d in which the wound electrode assembly 3 is wound. In addition, the negative electrode current collector 8 is welded and connected to the exposed portion of the negative electrode core body 5c in which the wound electrode assembly 3 is wound. Welded connection can be performed by using, for example, resistance welding, ultrasonic welding, and laser welding.

[Insertion of Wound Electrode Assembly into Exterior Assembly]

The wound electrode assembly 3 is wrapped with the resin insulating sheet 14, and the wound electrode assembly 3 is inserted into the exterior assembly 1. Thereafter, the exterior assembly 1 and the sealing plate 2 are welded together, and the opening of the exterior assembly 1 is sealed with the sealing plate 2.

[Non-Aqueous Electrolyte Injection Hole and Sealing]

The non-aqueous electrolyte produced in the above method is injected from the non-aqueous electrolyte injection hole 16 provided in the sealing plate 2, and the non-aqueous electrolyte injection hole 16 is sealed with a blind rivet as the sealing member 17. As described above, a non-aqueous electrolyte secondary battery 100 is produced.

Example 1

A non-aqueous electrolyte secondary battery having the following configuration was produced in the same manner as in the non-aqueous electrolyte secondary battery 100 described above to provide the non-aqueous electrolyte secondary battery in Example 1.

1.0% by mass of lithium fluorosulfonate was added to a non-aqueous electrolyte, and the total amount A (μmol) of $FSO_3$ included in the non-aqueous electrolyte to be injected into the battery case 200 was 3.77 μmol. The total amount of $FSO_3$ included in the non-aqueous electrolyte to be injected into the battery case 200 can be adjusted by the content ratio of lithium fluorosulfonate in the non-aqueous electrolyte and the amount of the non-aqueous electrolyte to be injected into the battery case 200.

In addition, the positive electrode active material having a BET specific surface area of 2.46 $m^2/g$ was used, and the total surface area B ($m^2$) of the positive electrode active material included in the positive electrode active material layer 4b of the positive electrode plate 4 to be placed in the battery case 200 was 77.00 ($m^2$). The total surface area of the positive electrode active material can be calculated from the BET specific surface area of the positive electrode active material and the total mass of the positive electrode active material included in the positive electrode active material layer 4b.

Example 2

A non-aqueous electrolyte secondary battery having the following configuration was produced in the same manner as in the non-aqueous electrolyte secondary battery 100 described above to provide the non-aqueous electrolyte secondary battery in Example 2.

1.0% by mass of lithium fluorosulfonate was added to a non-aqueous electrolyte, and the total amount A (μmol) of $FSO_3$ included in the non-aqueous electrolyte to be injected into the battery case 200 was 4.71 μmol. In addition, the positive electrode active material having a BET specific surface area of 2.46 m$^2$/g was used, and the total surface area B (m$^2$) of the positive electrode active material included in the positive electrode active material layer 4b of the positive electrode plate 4 to be placed in the battery case 200 was 77.00 (m$^2$).

Example 3

A non-aqueous electrolyte secondary battery having the following configuration was produced in the same manner as in the non-aqueous electrolyte secondary battery 100 described above to provide the non-aqueous electrolyte secondary battery in Example 3.

1.0% by mass of lithium fluorosulfonate was added to a non-aqueous electrolyte, and the total amount A (μmol) of $FSO_3$ included in the non-aqueous electrolyte to be injected into the battery case 200 was 5.66 μmol. In addition, the positive electrode active material having a BET specific surface area of 2.46 m$^2$/g was used, and the total surface area B (m$^2$) of the positive electrode active material included in the positive electrode active material layer 4b of the positive electrode plate 4 to be placed in the battery case 200 was 77.00 (m$^2$).

Comparative Example 1

A non-aqueous electrolyte secondary battery having the following configuration was produced in the same manner as in the non-aqueous electrolyte secondary battery 100 described above to provide the non-aqueous electrolyte secondary battery in Comparative Example 1.

Lithium fluorosulfonate was not added to the non-aqueous electrolyte so that the non-aqueous electrolyte to be injected into the battery case 200 did not contain $FSO_3$. In addition, the positive electrode active material having a BET specific surface area of 2.38 m$^2$/g was used, and the total surface area B (m$^2$) of the positive electrode active material included in the positive electrode active material layer 4b of the positive electrode plate 4 to be placed in the battery case 200 was 83.87 (m$^2$).

Comparative Example 2

A non-aqueous electrolyte secondary battery having the following configuration was produced in the same manner as in the non-aqueous electrolyte secondary battery 100 described above to provide the non-aqueous electrolyte secondary battery in Comparative Example 2.

1.0% by mass of lithium fluorosulfonate was added to a non-aqueous electrolyte, and the total amount A (μmol) of $FSO_3$ included in the non-aqueous electrolyte to be injected into the battery case 200 was 4.15 μmol. In addition, the positive electrode active material having a BET specific surface area of 1.32 m$^2$/g was used, and the total surface area B (m$^2$) of the positive electrode active material included in the positive electrode active material layer 4b of the positive electrode plate 4 to be placed in the battery case 200 was 42.90 (m$^2$).

Comparative Example 3

A non-aqueous electrolyte secondary battery having the following configuration was produced in the same manner as in the non-aqueous electrolyte secondary battery 100 described above to provide the non-aqueous electrolyte secondary battery in Comparative Example 3.

1.0% by mass of lithium fluorosulfonate was added to a non-aqueous electrolyte, and the total amount A (μmol) of $FSO_3$ included in the non-aqueous electrolyte to be injected into the battery case 200 was 1.04 μmol. In addition, the positive electrode active material having a BET specific surface area of 1.32 m$^2$/g was used, and the total surface area B (m$^2$) of the positive electrode active material included in the positive electrode active material layer 4b of the positive electrode plate 4 to be placed in the battery case 200 was 42.90 (m$^2$).

Comparative Example 4

A non-aqueous electrolyte secondary battery having the following configuration was produced in the same manner as in the non-aqueous electrolyte secondary battery 100 described above to provide the non-aqueous electrolyte secondary battery in Comparative Example 4.

The non-aqueous electrolyte to be injected into the battery case 200 did not contain $FSO_3$. In addition, the positive electrode active material having a BET specific surface area of 1.33 m$^2$/g was used, and the total surface area B (m$^2$) of the positive electrode active material included in the positive electrode active material layer 4b of the positive electrode plate 4 to be placed in the battery case 200 was 46.87 (m$^2$).

The following tests were performed on the non-aqueous electrolyte secondary batteries of Examples 1 to 3 and Comparative Examples 1 to 4.

<Measurement of Low Temperature Output Characteristics>

A non-aqueous electrolyte secondary battery was charged to a charging depth (SOC) of 27% with a charging current of 4.0 A in an environment of 25° C. Then, the non-aqueous electrolyte secondary battery was left to stand in an environment of −35° C. for 5 hours. Thereafter, in an environment of −35° C., discharge was performed for 10 seconds with currents of 12 A, 24 A, 36 A, 48 A, 60 A, and 72 A, and the respective battery voltages were measured. The output (W) was calculated from the I-V characteristics in discharging by plotting each of the current values and the battery voltages, and the low temperature output characteristics were thus obtained. The charging depth deviated by the discharge was returned to the original charging depth by charging with a constant current of 0.4 A.

<Measurement of High Temperature Storage Characteristics>

A non-aqueous electrolyte secondary battery was charged to 4.1 V with a constant current of 4.0 A in an environment of 25° C., and subsequently charged with a constant voltage of 4.1 V for 2 hours. Thereafter, the discharge capacity was measured when constant current discharge was performed to 3.0 V with a current of 2 A and subsequently constant voltage discharge was performed at 3.0 V for 3 hours, and this discharge capacity was defined as the battery capacity before the high temperature storage test. In addition, the battery was charged to a charging depth of 56% with a charging current of 4.0 A in an environment of 25° C., and left to stand in an environment of −10° C. for 5 hours. Thereafter, the low temperature discharge resistance before the high temperature storage test was calculated by dividing the difference of the battery voltage between before and after discharging for 10 seconds with a current of 60 A by the discharge current (60 A).

Low temperature discharge resistance before high temperature storage test=(voltage before discharging for 10 seconds with current of 60 A–battery voltage after discharging for 10 seconds with current of 60 A)/discharge current(60 A)

Then, the battery was charged to a charging depth of 80% with a charging current of 4.0 A in an environment of 25° C., and left to stand in an environment of 75° C. for 60 days. Thereafter, constant current charging was performed to 4.1 V with a current of 3.8 to 4.0 A at 25° C., and subsequently constant voltage charging was performed at 4.1 V for 2 hours. Thereafter, the discharge capacity was measured when constant current discharge was performed to 3.0 V with a current of 4.0 A and subsequently constant voltage discharge was performed at 3.0 V for 3 hours, and this was defined as the battery capacity after the high temperature storage test. The ratio of the battery capacity after the high temperature storage test to the battery capacity before the high temperature storage test was calculated as the high temperature storage capacity retention rate. In addition, the battery was charged to a charging depth of 56% with a charging current of 4.0 A in an environment of 25° C. and left to stand for 5 hours in an environment of −10° C., and the difference of the battery voltage between before and after discharging for 10 seconds with a current of 60 A was divided by the discharge current (60 A) to obtain the low temperature discharge resistance after high temperature storage.

Low temperature discharge resistance after high temperature storage test=(voltage before discharging for 10 seconds with current of 60 A–battery voltage after discharging for 10 seconds with current of 60 A)/discharge current(60 A)

High temperature storage capacity retention rate (%)=battery capacity after high temperature storage test÷battery capacity before high temperature storage test×100

High temperature storage resistance increase rate (%)=low temperature discharge resistance after high temperature storage÷low temperature discharge resistance before storage test×100

<Measurement of Cycle Characteristics>

A non-aqueous electrolyte secondary battery was charged to 4.1 V with a constant current of 4.0 A in an environment of 25° C., and subsequently charged with a constant voltage of 4.1 V for 2 hours. Thereafter, the discharge capacity was measured when constant current discharge was performed to 3.0 V with a current of 2.0 A and subsequently constant voltage discharge was performed at 3.0 V for 3 hours, and this discharge capacity was defined as the battery capacity before the cycle test. In addition, the battery was charged to a charging depth of 56% with a charging current of 4.0 A in an environment of 25° C., and left to stand in an environment of −10° C. for 5 hours. Thereafter, the low temperature discharge resistance before the cycle test was calculated by dividing the difference of the battery voltage between before and after discharging for 10 seconds with a current of 60 A by the discharge current (60 A).

Low temperature discharge resistance before cycle test=(voltage before discharging for 10 seconds with current of 60 A–battery voltage after discharging for 10 seconds with current of 60 A)/discharge current(60 A)

Then, in an environment of 75° C., 2500 cycles of pulse charging and discharging of charging or discharging a current of 32.5 It (130 A) or less within 60 seconds were performed. Herein, the battery after the pulse cycle was discharged under the same conditions as the measurement of the battery capacity before the cycle test described above, and the discharge capacity was measured to be defined as the battery capacity after the cycle test. The cycle capacity retention rate was calculated by the following formula.

In addition, the discharge was performed under the same conditions as the low temperature discharge resistance before the cycle test described above, and the low temperature discharge resistance after the cycle test was calculated. The resistance increase rate after cycle was calculated by the following formula:

Low temperature discharge resistance after the cycle test=(voltage before discharging for 10 seconds with current of 60 A–battery voltage after discharging for 10 seconds with current of 60 A)/discharge current(60 A)

Cycle capacity retention rate (%)÷battery capacity after cycle test+battery capacity before cycle test×100

Cycle resistance increase rate (%)=low temperature discharge resistance after cycle test÷low temperature discharge resistance before cycle test× 100

Table 1 shows the test results of each of non-aqueous electrolyte secondary batteries. The low temperature output characteristics of each of non-aqueous electrolyte secondary batteries are shown as relative values when the low temperature output (W) of the non-aqueous electrolyte secondary battery of Example 1 is 100%.

TABLE 1

| | Total amount of $FSO_3$ in non-aqueous electrolyte (μmol) | BET specific surface area of positive electrode active material (m²/g) | Total surface area of positive electrode active material (m²) | Total amount of $FSO_3$ in non-aqueous electrolyte (μmol)/total surface area of positive electrode active material (m²) | Low temperature output characteristics (%) | High temperature storage retention rate (%) | High temperature storage resistance increase rate (%) | Cycle capacity retention rate (%) | Cycle resistance increase rate (%) |
|---|---|---|---|---|---|---|---|---|---|
| Example 1 | 3.77 | 2.46 | 77.00 | 0.05 | 100 | 84 | 107 | 85 | 108 |
| Example 2 | 4.71 | 2.46 | 77.00 | 0.06 | 100 | 86 | 103 | 86 | 106 |
| Example 3 | 5.66 | 2.46 | 77.00 | 0.07 | 100 | 85 | 104 | 85 | 107 |
| Comparative Example 1 | 0 | 2.38 | 83.87 | 0 | 118 | 59 | 135 | — | — |

TABLE 1-continued

| | Total amount of FSO$_3$ in non-aqueous electrolyte (μmol) | BET specific surface area of positive electrode active material (m$^2$/g) | Total surface area of positive electrode active material (m$^2$) | Total amount of FSO$_3$ in non-aqueous electrolyte (μmol)/total surface area of positive electrode active material (μmol/m$^2$) | Low temperature output characteristics (%) | High temperature storage retention rate (%) | High temperature storage resistance increase rate (%) | Cycle capacity retention rate (%) | Cycle resistance increase rate (%) |
|---|---|---|---|---|---|---|---|---|---|
| Comparative Example 2 | 4.15 | 1.32 | 42.90 | 0.1 | 87 | 82 | 107 | 85 | 107 |
| Comparative Example 3 | 1.04 | 1.32 | 42.90 | 0.02 | 89 | 74 | 124 | 75 | 119 |
| Comparative Example 4 | 0 | 1.33 | 46.87 | 0 | 84 | 60 | 135 | 78 | 124 |

For the non-aqueous electrolyte secondary battery of Comparative Example 1, the high temperature storage capacity retention rate is low and the high temperature storage resistance increase rate is high. This is considered to be because the non-aqueous electrolyte contained no FSO$_3$, easily leading to the side reaction between the surface of the positive electrode active material and the non-aqueous electrolyte when the non-aqueous electrolyte secondary battery was stored in a high temperature condition. It is considered that due to the side reaction between the surface of the positive electrode active material and the non-aqueous electrolyte, manganese contained in the positive electrode active material was eluted into the non-aqueous electrolyte, the Li insertion/desorption sites in the positive electrode active material were reduced, and the growth of Li deposition with high resistance on the surface of the positive electrode active material was promoted.

For the non-aqueous electrolyte secondary battery of Comparative Example 2, the initial low temperature output characteristic is poor. The total amount of FSO$_3$ in the non-aqueous electrolyte A (μmol)/the total area of the positive electrode active material B (m$^2$) is 0.1 (μmol/m$^2$), and the BET specific surface area of the positive electrode active material is 1.31 m$^2$/g. As described above, when the BET specific surface area of the positive electrode active material is low and the A/B value is high, it is considered that the charge transfer resistance at the interface between the non-aqueous electrolyte and the positive electrode active material is high and therefore the initial low temperature output characteristics are poor.

For the non-aqueous electrolyte secondary batteries of Comparative Examples 3 and 4, the low temperature output characteristics are poor, the high temperature storage capacity retention rate is low, the high temperature storage resistance increase rate is high, the cycle capacity retention rate is high, and the cycle resistance increase rate is high. This is considered to be because the BET specific surface area of the positive electrode active material is low and the charge transfer resistance at the interface between the non-aqueous electrolyte and the positive electrode active material is high. In addition, when the value of the total amount of FSO$_3$ in the non-aqueous electrolyte A (μmol)/the total area of the positive electrode active material B (m$^2$) is low and the non-aqueous electrolyte secondary battery is stored or charged and discharged at a high temperature, the side reaction between the surface of the positive electrode active material and the non-aqueous electrolyte easily occurs. This is considered to be because manganese contained in the positive electrode active material was eluted into the non-aqueous electrolyte, the Li insertion/desorption sites in the positive electrode active material were reduced, and the growth of Li deposition with high resistance on the surface of the positive electrode active material was promoted.

For the non-aqueous electrolyte secondary batteries of Examples 1 to 3, the BET specific surface area of the positive electrode active material is 2.0 to 3.0 m$^2$/g, the total surface area of the positive electrode active material included in the positive electrode active material layer is 70 to 80 m$^2$, and the value of the total amount of FSO$_3$ in the non-aqueous electrolyte A (μmol)/the total area of the positive electrode active material B (m$^2$) is 0.03 to 0.09 (μmol/m$^2$). Thus, the charge-and-discharge reaction area of the positive electrode active material is increased, reducing the charge transfer resistance in low temperature discharge, and the side reaction between the surface of the positive electrode active material and the non-aqueous electrolyte can be effectively suppressed by FSO$_3$ when storage or charge-and-discharge cycles were performed in a high temperature condition. Therefore, the elution of manganese from the positive electrode active material into the non-aqueous electrolyte can be effectively suppressed, and the growth of Li deposition with high resistance on the surface of the positive electrode active material is effectively suppressed.

Therefore, for the non-aqueous electrolyte secondary batteries of Examples 1 to 3, the low temperature output characteristics are high, the high temperature storage capacity retention rate is high, the high temperature storage resistance increase rate is low, the cycle capacity retention rate is high, and the cycle resistance increase rate is low.

The amount of Li (mol)/transition metal (mol) in the lithium transition metal composite oxide is preferably 1.1 to 1.25.

The content ratio of lithium fluorosulfonate in the non-aqueous electrolyte is preferably 0.25 to 2.0% by mass, and more preferably 0.5 to 1.5% by mass.

The packing density of the positive electrode active material layer is preferably 2.3 to 2.5 g/cm$^3$, and more preferably 2.4 to 2.5 g/cm$^3$.

The lithium transition metal composite oxide preferably includes at least one of zirconium and tungsten.

<Other Components>

The lithium transition metal composite oxide is preferable as a positive electrode active material. Examples of the lithium transition metal composite oxide include lithium cobalt oxide (LiCoO$_2$), lithium manganate (LiMn$_2$O$_4$), lithium nickel oxide (LiNiO$_2$), lithium nickel manganese composite oxide (LiNi$_{1-x}$Mn$_x$O$_2$ (0<x<1)), lithium nickel cobalt composite oxide (LiNi$_{1-x}$Co$_x$O$_2$ (0<x<1)), and lithium nickel cobalt manganese composite oxide (LiNi$_x$Co$_y$Mn$_z$O$_2$ (0<x<1, 0<y<1, 0<z<1, x+y+z=1)).

In addition, those obtained by adding, for example, Al, Ti, Zr, Nb, B, W, Mg, or Mo to the above lithium transition metal composite oxide can be used. Examples thereof include the lithium transition metal composite oxide represented by at least Li$_{1+a}$Ni$_x$Co$_y$Mn$_z$M$_b$O$_2$ (M is at least one element selected from Al, Ti, Zr, Nb, B, Mg and Mo, 0≤a≤0.2, 0.2≤x≤0.5, 0.2≤y≤0.5, 0.2≤z≤0.4, 0≤b≤0.02, and a+b+x+y+z=1).

The carbon material capable of absorbing and desorbing lithium ions can be used as a negative electrode active material. Examples of the carbon material capable of absorbing and desorbing lithium ions include graphite, hardly graphitizable carbon, easily graphitizable carbon, fibrous carbon, coke, and carbon black. Of these, graphite is particularly preferable. Moreover, examples of the non-carbon material include silicon, tin, and alloys or oxides mainly including them.

For example, carbonates, lactones, ethers, ketones, and esters can be used as a non-aqueous solvent (organic solvent) of the non-aqueous electrolyte, and two or more of these solvents can be used in admixture. For example, cyclic carbonates such as ethylene carbonate, propylene carbonate, and butylene carbonate; and chain carbonates such as dimethyl carbonate, ethyl methyl carbonate, and diethyl carbonate can be used. Particularly, a mixed solvent of cyclic carbonate and chain carbonate is preferably used. In addition, unsaturated cyclic carbonates such as vinylene carbonate (VC) can be added to a non-aqueous electrolyte. The non-aqueous electrolyte more preferably includes propylene carbonate and methylene propionate (MP).

The non-aqueous electrolyte preferably includes lithium bisoxalate borate (LiC$_4$BO$_8$) and lithium difluorophosphate (LiPF$_2$O$_2$).

Those generally used as the electrolyte salt in the conventional lithium ion secondary battery can be used as the electrolyte salt of a non-aqueous electrolyte solution. For example, LiPF$_6$, LiBF$_4$, LiCF$_3$SO$_3$, LiN(CF$_3$SO$_2$)$_2$, LiN(C$_2$F$_5$SO$_2$)$_2$, LiN(CF$_3$SO$_2$)(C$_4$F$_9$SO$_2$), LiC(CF$_3$SO$_2$)$_3$, LiC(C$_2$F$_5$SO$_2$)$_3$, LiAsF$_6$, LiClO$_4$, Li$_2$B$_{10}$Cl$_{10}$, Li$_2$B$_{12}$Cl$_{12}$, LiB(C$_2$O$_4$)$_2$, LiB(C$_2$O$_4$)F$_2$, LiP(C$_2$O$_4$)$_3$, LiP(C$_2$O$_4$)$_2$F$_2$, LiP(C$_2$O$_4$)F$_4$, and a mixture thereof are used. Of these, LiPF$_6$ is particularly preferable. The amount of the electrolyte salt dissolved in the above non-aqueous solvent is preferably 0.5 to 2.0 mol/L.

A porous separator made of polyolefins such as polypropylene (PP) or polyethylene (PE) is preferably used as a separator. Particularly, the separator having a three-layer structure with polypropylene (PP) and polyethylene (PE) (PP/PE/PP or PE/PP/PE) is preferably used. In addition, the separator can be provided with a heat resistant layer consisting of inorganic particles such as alumina and a binder. In addition, a polymer electrolyte may be used as a separator.

Preferably, the surface of the negative electrode active material layer is in direct contact with the polyolefin layer of the separator and the thickness of the separator is 14 to 23 µm. This configuration provides the non-aqueous electrolyte secondary battery that is superior in output characteristics. The thickness of the separator is more preferably 14 to 19 µm.

REFERENCE SIGNS LIST

100 Non-aqueous electrolyte secondary battery
200 Battery case
1 Exterior assembly
2 Sealing plate
3 Wound electrode assembly
4 Positive electrode plate
4a Positive electrode core body
4b Positive electrode active material layer
4c Positive electrode protective layer
4d Exposed portion of positive electrode core body
5 Negative electrode plate
5a Negative electrode core body
5b Negative electrode active material layer
5c Exposed portion of negative electrode core body
6 Positive electrode current collector
7 Positive electrode terminal
8 Negative electrode current collector
9 Negative electrode terminal
10 Inner insulating member
11 Outer insulating member
12 Inner insulating member
13 Outer insulating member
14 Insulating sheet
15 Gas exhaust valve
16 Non-aqueous electrolyte injection hole
17 Sealing member

The invention claimed is:

1. A non-aqueous electrolyte secondary battery, comprising:
    a positive electrode plate having a positive electrode core body and a positive electrode active material layer formed on the positive electrode core body, the positive electrode active material layer including a positive electrode active material;
    a negative electrode plate;
    a flat wound electrode assembly obtained by winding the positive electrode plate and the negative electrode plate with a separator therebetween; and
    a non-aqueous electrolyte including FSO$_3$, wherein
    the positive electrode active material is a lithium transition metal composite oxide including manganese,
    a BET specific surface area of the positive electrode active material is 2.0 to 3.0 m$^2$/g,
    a total surface area of the positive electrode active material included in the positive electrode active material layer is 70 to 80 m$^2$, and
    when a total amount of FSO$_3$ included in the non-aqueous electrolyte is denoted by A (µmol) and a total surface area of the positive electrode active material included in the positive electrode active material layer is denoted by B (m$^2$),
    a value of A/B is 0.05 to 0.07 (µmol/m$^2$).

2. The non-aqueous electrolyte secondary battery according to claim 1, wherein an amount of manganese included in the lithium transition metal composite oxide is 10 to 40 mol % with respect to a total amount of transition metals included in the lithium transition metal composite oxide.

3. The non-aqueous electrolyte secondary battery according to claim 2, wherein the lithium transition metal composite oxide includes nickel and cobalt.

4. The non-aqueous electrolyte secondary battery according to claim 1,
    wherein an exposed portion of a wound positive electrode core body is provided at one end of the flat wound electrode assembly, and
    an exposed portion of a wound negative electrode core body is provided at the other end of the flat wound electrode assembly.

5. The non-aqueous electrolyte secondary battery according to claim 1,
wherein a separator having a polyolefin layer is placed between the positive electrode plate and the negative electrode plate,
a surface of the negative electrode active material layer is in direct contact with the polyolefin layer, and
the separator has a thickness of 14 to 23 μm.

6. A method for producing a non-aqueous electrolyte secondary battery, the battery comprising:
a positive electrode plate having a positive electrode core body and a positive electrode active material layer formed on the positive electrode core body, the positive electrode active material layer including a positive electrode active material;
a negative electrode plate;
a flat wound electrode assembly obtained by winding the positive electrode plate and the negative electrode plate with a separator therebetween;
a non-aqueous electrolyte including $FSO_3$; and
a battery case accommodating the wound electrode assembly and the non-aqueous electrolyte, the method comprising:
a step of producing the electrode assembly including the positive electrode plate wherein the positive electrode active material is a lithium transition metal composite oxide including manganese, a BET specific surface area of the positive electrode active material is 2.0 to 3.0 $m^2/g$, and a total surface area of the positive electrode active material included in the positive electrode active material layer is 70 to 80 $m^2$; and
a step of placing the electrode assembly and the non-aqueous electrolyte including $FSO_3$ in the battery case,
wherein, when a total amount of $FSO_3$ included in the non-aqueous electrolyte is denoted by A (μmol) and a total surface area of the positive electrode active material included in the positive electrode active material layer is denoted by B ($m^2$),
a value of A/B is 0.05 to 0.07 (μmol/$m^2$).

* * * * *